United States Patent [19]
Allen et al.

[11] Patent Number: 5,606,313
[45] Date of Patent: Feb. 25, 1997

[54] LOW POWER ADDRESSABLE DATA COMMUNICATION DEVICE AND METHOD

[75] Inventors: Steven P. Allen, Mesa; Scott T. Demarest; Thomas R. Troksa, both of Gilbert, all of Ariz.

[73] Assignee: Motorola, Inc., Schaumburg, Ill.

[21] Appl. No.: 558,619

[22] Filed: Nov. 14, 1995

Related U.S. Application Data

[63] Continuation of Ser. No. 165,212, Dec. 10, 1993, abandoned.

[51] Int. Cl.$^6$ .............................. G08B 5/22; H04B 7/00; H04Q 3/02; H04Q 9/14
[52] U.S. Cl. .............................. 340/825.54; 340/825.44; 455/38.3; 455/343
[58] Field of Search ................ 340/825.54, 825.44, 340/572, 505; 455/343, 38.3

[56] References Cited

U.S. PATENT DOCUMENTS

| | | | |
|---|---|---|---|
| 4,437,095 | 3/1984 | Akahori et al. | 340/825.44 |
| 4,479,201 | 10/1984 | Oda et al. | 455/343 |
| 4,506,386 | 3/1985 | Ichikawa et al. | 340/825.44 |
| 4,599,615 | 7/1986 | Umetsu | 340/825.44 |
| 4,816,820 | 3/1989 | Davis | 340/825.44 |
| 4,839,639 | 6/1989 | Sato et al. | 340/825.44 |
| 4,903,335 | 2/1990 | Shimizu | 455/343 |
| 5,005,014 | 4/1991 | Jasiuski | 340/825.54 |
| 5,214,410 | 5/1993 | Verster | 340/572 |
| 5,231,273 | 7/1993 | Caswell et al. | 235/385 |
| 5,239,306 | 8/1993 | Siwiak et al. | 340/825.44 |

FOREIGN PATENT DOCUMENTS

| | | | |
|---|---|---|---|
| 0234201 | 1/1987 | European Pat. Off. | H04Q 7/02 |
| 2088604 | 6/1982 | United Kingdom | H04B 5/02 |
| 2276061 | 3/1993 | United Kingdom | H04Q 7/04 |
| 8500235 | 1/1985 | WIPO | G08B 13/24 |
| 9011652 | 10/1990 | WIPO | H04B 1/16 |

*Primary Examiner*—Larry D. Donaghue
*Assistant Examiner*—Mark H. Rinehart
*Attorney, Agent, or Firm*—Frederick M. Fliegel

[57] ABSTRACT

An electronic tag (10) receives a data message (18) that has a wake-up section (20) followed by a session section (22). The interrogation signal which carries the data message encodes the wake-up section (20) differently from the session section (22). A power manager (28) decodes the wake-up section (20) using a very low power decoder (34) that remains energized during a standby state. When the power manager (28) detects a predetermined identification code (26), it controls a switching circuit (32) to energize a controller (30). The controller (30) may then decode, process, and respond to information conveyed during the session section (22). If the power manager (28) does not detect the identification code (26), the controller (30) remains de-energized. The power manager (28) also includes a synchronizer (38) which determines when a preamble (24) is detected, and an ID decoder (40) that determines when the wake-up section (20) conveys the predetermined identification code (26).

19 Claims, 5 Drawing Sheets

LOW POWER ADDRESSABLE DATA COMMUNICATION DEVICE AND METHOD

This application is continuation of prior application Ser. No. 08/165,212, filed Dec. 10, 1993, now abandoned.

TECHNICAL FIELD OF THE INVENTION

The present invention relates generally to addressable data communication devices wherein many devices may receive the same data communication messages, and the messages have addresses or identification codes that define which device or devices should respond to the messages. In additions, the present invention relates to data communication devices in which energization to various components is managed to reduce power consumption.

BACKGROUND OF THE INVENTION

Data communication devices receive data from other data communication devices and/or transmit data to other data communication devices. Data communication devices are often addressable when more than two devices share a common communication channel. An address is a data code that uniquely identifies a device or a set of devices. When a data message transmitted through the common communication channel conveys an address, such as a phone number, path, ID code, or the like, a device that receives the data message decodes the address to determine what to do with the message.

Electronic tags represent one form of data communication device known to those skilled in the art. Electronic tags are low cost transponders which receive and transmit data messages via radio frequency (RF) signals. Typically, an interrogator transmits a data message which contains an ID code. All tags within range of the interrogator receive this data message. The ID code addresses a particular tag or category of tags. Each tag that receives the data message determines whether its ID or a category to which it belongs matches the address conveyed by the data message. If a tag determines that the data message is addressed to it, the tag processes the data message and typically responds by transmitting its own data message back to the interrogator.

Electronic tags are often battery powered. In order to increase battery life, conventional tags are maintained in a very low current, standby state until they sense RF energy from an interrogator. When a conventional tag detects such RF energy, it goes into a high current, operational state by powering up all its circuitry. Once operational, the conventional tag processes the received data message. In one of the first tasks performed after becoming operational, the conventional tag determines whether the received data message is actually addressed to the tag. If the data message is addressed to the tag, the tag continues to process the message and respond with requested information. After the tag completes the transaction, it again returns to its low current, standby state. If the data message is not addressed to the conventional tag, it directly returns to its low current, standby state.

This power management scheme works acceptably well in scenarios where tags are associated with moving objects, such as vehicles, railroad cars, trucks, or other objects which are interrogated only occasionally. However, where tags are associated with stationary objects, such as in a warehouse or inventory management environment, or with other objects which tend to receive numerous interrogations, battery life is severely shortened. In inventory management and other situations, many tags can be within range of an interrogator at all times. Each time an interrogator addresses an interrogation to a particular tag, all tags within range go to their high current, operational states. However, only the addressed tag actually processes the interrogation to any significant extent and responds to the interrogation.

SUMMARY OF THE INVENTION

Accordingly, it is an advantage of the present invention that an improved low power, addressable data communication device is provided.

Another advantage of the present invention is that an electronic tag with improved battery life is provided.

Another advantage is that the present invention allows an electronic tag to remain in a low current, standby state while in the presence of an interrogation signal except for when the tag is specifically addressed by the interrogation signal.

Another advantage is that the present invention provides separate decoding paths for obtaining data from an interrogation signal, wherein a separate decoding path permits a low power decoder to control energization of a high power decoding path.

Another advantage is that the present invention includes a power manager that decodes a portion of an interrogation signal while consuming very little power.

The above and other advantages of the present invention are carried out in one form by a low power, addressable data communication device and associated method. The device includes some means for obtaining a data message having a wake-up section and a session section. The device also includes a power manager. The power manager has an input coupled to the obtaining means and has an output. The power manager is configured to detect a predetermined identification code from the wake-up section of the data message. The device further includes a controller. The controller has a power input coupled to the power manager output and has a data input coupled to the obtaining means. The controller is configured to process the session section of the data message after the power manager detects the predetermined identification code.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
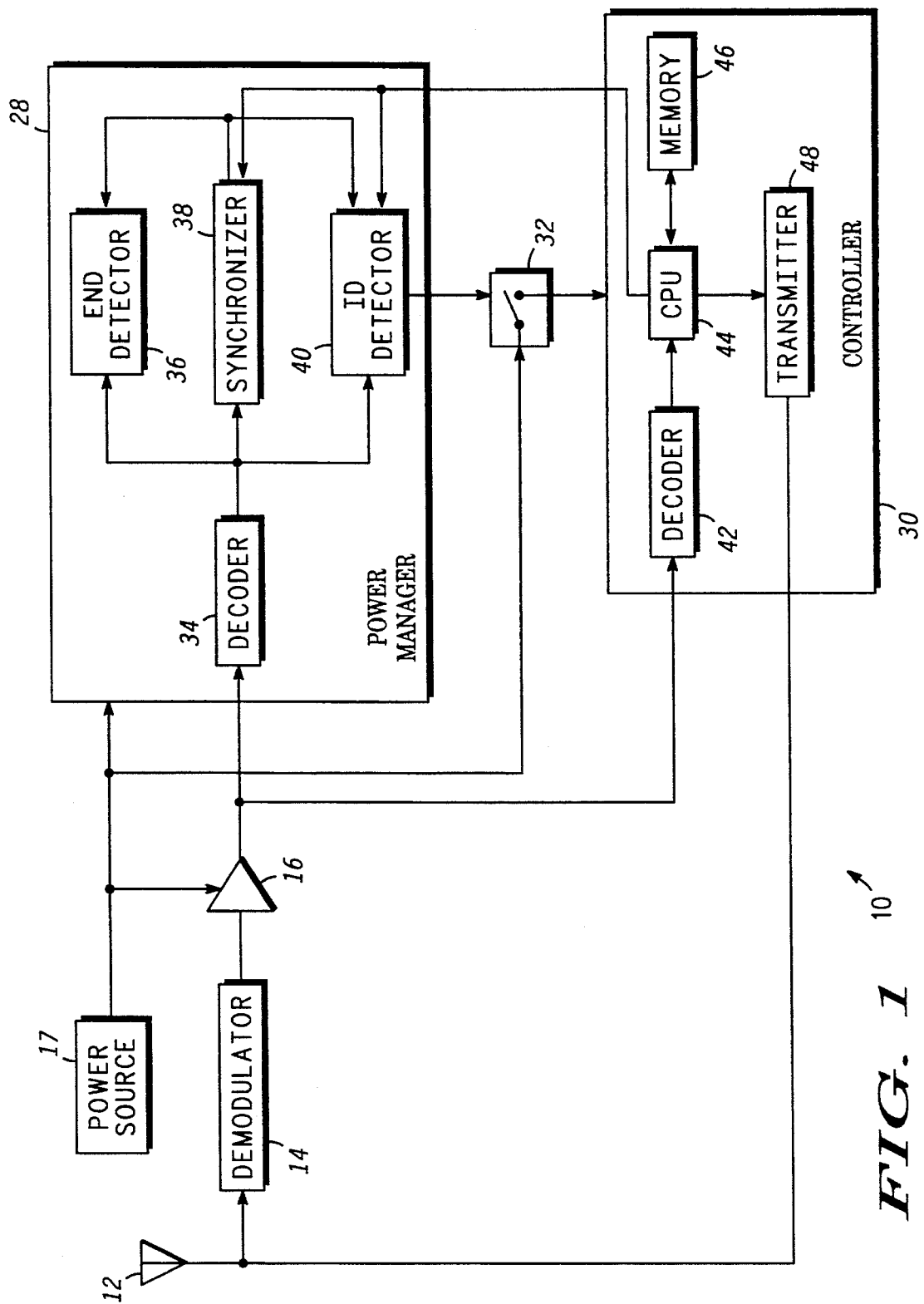
FIG. 1 shows a block diagram of an electronic tag configured in accordance with the principles of the present invention.

FIG. 1 shows a block diagram of electronic tag 10 configured in accordance with the principles of the present invention. Tag 10 is a data communication device which receives and transmits data messages, preferably through radio frequency (RF) signals. Tag 10 may be used in applications where it is desirable to identify and track specific objects. A population of tags 10 may be associated with a corresponding population of objects, e.g., vehicles, railroad cars, trucks, inventory items, employees, etc. Each tag 10 desirably has its own unique identification code. Interrogators (not shown) may be placed near areas where the objects may be located or near transportation routes over which the objects may pass. Each interrogator may, from time to time, transmit RF signals to tags 10 within range of the interrogator. The interrogation signals may request a specific tag 10, any tag 10 from a specified class of tags 10, or any tag 10 from the population of tags 10 to respond by transmitting an RF response signal back to the interrogator. The interrogation may request tag 10 to store data and/or to transmit various items of data in response.

Tag 10 includes antenna 12 into which RF interrogation signals are received and from which RF response signals are transmitted. Antenna 12 couples to demodulator 14, which strips RF modulation away from a data message conveyed by a received interrogation signal. In the preferred embodiment, demodulator 14 is implemented using passive components and consumes no battery power. Demodulator 14 couples to an input of low power amplifier 16. Amplifier 16 desirably includes active components which couple to power source 17, e.g., a battery. Amplifier 16 desirably remains energized in both standby and operational states. However, amplifier 16 uses conventional low power amplification circuits which preferably consume only a few micro amps.

Thus, amplifier 16 obtains a data message from which a carrier signal has been stripped. However, data conveyed by the data message may still be, and desirably are, encoded or modulated in some way. When data, such as the data message obtained by amplifier 16, are communicated serially, a data-communicating signal expresses one data element at one point in time, another data element at another point in time, and so on. Since the data change in time, some transition period exists between the instants where data elements are expressed through the communicating signal. In communicating data, communication systems encode and/or modulate the data-communicating signal. The encoding and/or modulation are performed, among other reasons, to help a receiving data communication device to distinguish instants in time where the data-communicating signal is expressing data elements from data transition periods, and to accurately identify the conveyed data elements.

Figure 2:
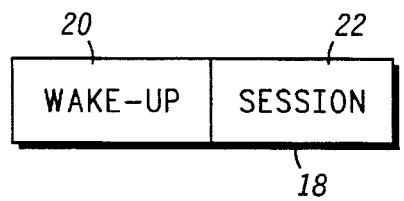
FIG. 2 shows a data format diagram of an interrogation data message.

FIG. 2 shows a data format diagram of preferred interrogation data message 18 which is obtained from an interrogator. Data message 18 (FIG. 3) includes wake-up section 20 followed by session section 22. Desirably, wake-up section 20 is encoded in a manner which combines a clock signal with data, e.g., Manchester coding. The clock signal conveys timing information indicating when data are valid (not transitioning). Such encoding schemes may be decoded by relatively simple circuits which consume less power than more complex circuits. Wake-up section 20 desirably conveys data at a relatively slow data rate, preferably less than 17 kHz, further contributing to low power consumption by decoding circuits. On the other hand, session section 22 may experience a different encoding scheme which desirably operates at a faster data rate than wake-up section 20.

Figure 3:
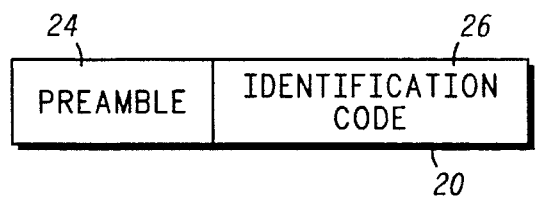
FIG. 3 shows a data format diagram of a wake-up section of the interrogation.

FIG. 3 is a data format diagram of preferred wake-up section 20 of data message 18 (FIG. 2). Wake-up section 20 includes preamble 24 followed by identification code 26 preamble 24 represents a predetermined code which helps tags 10 (FIG. 1) find the beginning of identification code 26. Desirably, preamble 24 conveys the same code from interrogation to interrogation and from tag 10 to tag 10. While the preferred embodiment of the present invention uses the four bit code of "1100" for preamble 24, any length and any code for preamble 24 suitable for indicating synchronization may be used.

Identification code 26 represents a wake-up address that may or may not be unique to a given tag 10. When tag 10 determines that wake-up section 20 conveys identification code 26 assigned to that tag 10, that tag 10 becomes fully operational so that it may process and respond to session section 22 (FIG. 2). While the preferred embodiment of the present invention uses identification code 26 of length N=16, length N may vary to meet varying needs of specific applications.

Session section 22 (FIG. 2) may include any type of data that an interrogator may wish to communicate to tag 10. Such data may serve as instructions to tag 10 which cause tag 10 to take a specified action, e.g., reading or writing data. Such data may include addressing or identification data and password data which tag 10 examines prior to following any instructions. Thus, if identification code 26 (FIG. 3) does not present a unique code within a population of tags 10, a specific individual tag 10 may be uniquely identified by the combination of identification code 26 and Any addressing or identification data included in session section 22.

The output of amplifier 16 (FIG. 1) couples to data inputs of power manager 28 and controller 30. Power source 17 couples to a power input of power manager 28. Power manager 28 remains continuously energized, at least during the standby state. An output of power manager 28 couples to a control input of switching circuit 32. Power source 17 and a power input of controller 30 couple to signal ports of switching circuit 32. Thus, controller 30 is energized through switching circuit 32 under the control of power manager 28.

Power manager 28 includes decoder 34 configured to separate a clock signal from wake-up data during wake-up section 20 of data message 18 (FIG. 2). Clock and data outputs from decoder 34 couple to inputs of end detector 36, synchronizer 38, and ID detector 40. End detector 36 identifies when the end of identification code 26 and wake-up section 20 occur (FIG. 3). Synchronizer 38 detects occurrence of preamble 24, and ID detector 40 determines when a predetermined identification code follows the preamble. The identification code may vary from tag 10 to tag 10.

ID detector 40 provides the output from power manager 28 which couples to the control input of switching circuit 32. When ID detector 40 discovers the identification code for tag 10, switching circuit 32 is directed to energize controller 30. When ID detector 40 fails to discover the identification code for tag 10, switching circuit 32 is directed to refrain from energizing controller 30.

Controller 30 includes decoder 42, which has a data input that couples to the output of amplifier 16. Tag 10 includes two separate decoders for data conveyed through data message 18 (FIG. 2), one residing in power manager 28 and another in controller 30. Use of two separate decoders permits diverse encoding schemes in wake-up section 20 and session section 22, allowing decoder 34 and wake-up section 20 to be optimized for low power operation while decoder 42 and session section 22 are optimized for other purposes. Decoder-42 is preferably a general purpose decoder which may reliably decode data encoded or modulated in a variety of different schemes and at a variety of different data rates, including data rates far faster than that associated with wake-up section 20. Decoder 42 may be optimized for flexibility, desirable signal to noise ratios, and/or efficient spectrum utilization, rather than for low power operation.

An output of decoder 42 couples to central processing unit (CPU) 44, which may be embodied in a conventional microprocessor circuit. CPU 44 couples to memory 46 and transmitter 48. Transmitter 48 additionally couples to antenna 12. CPU 44 also couples to synchronizer 38 and ID detector 40 of power manager 28. CPU 44 obtains and processes data conveyed by data message 18 during session section 22 (FIG. 2). CPU 44 generates data which are routed through transmitter 48 and transmitted from antenna 12. Memory 46 stores a unique identifying code that is associated with tag 10 and programming instructions which define tasks performed by CPU 44 and controller 30. Memory 46 preferably may also save data received at tag 10 during an interrogation and other variables. CPU 44 couples to synchronizer 38 and ID detector 40 so that it may store data into various registers to control the operation of power manager 28. Under normal operating conditions, CPU 44 and controller 30 perform these functions only when wake-up section 20 of data message 18 conveys a recognized identification code 26 (FIG. 3).

While FIG. 1 shows decoder 42 as a separate component from CPU 44, in an alternate embodiment (not shown) decoder 42 and CPU 44 may both be substantially implemented in a common microprocessor circuit.

Figure 4:
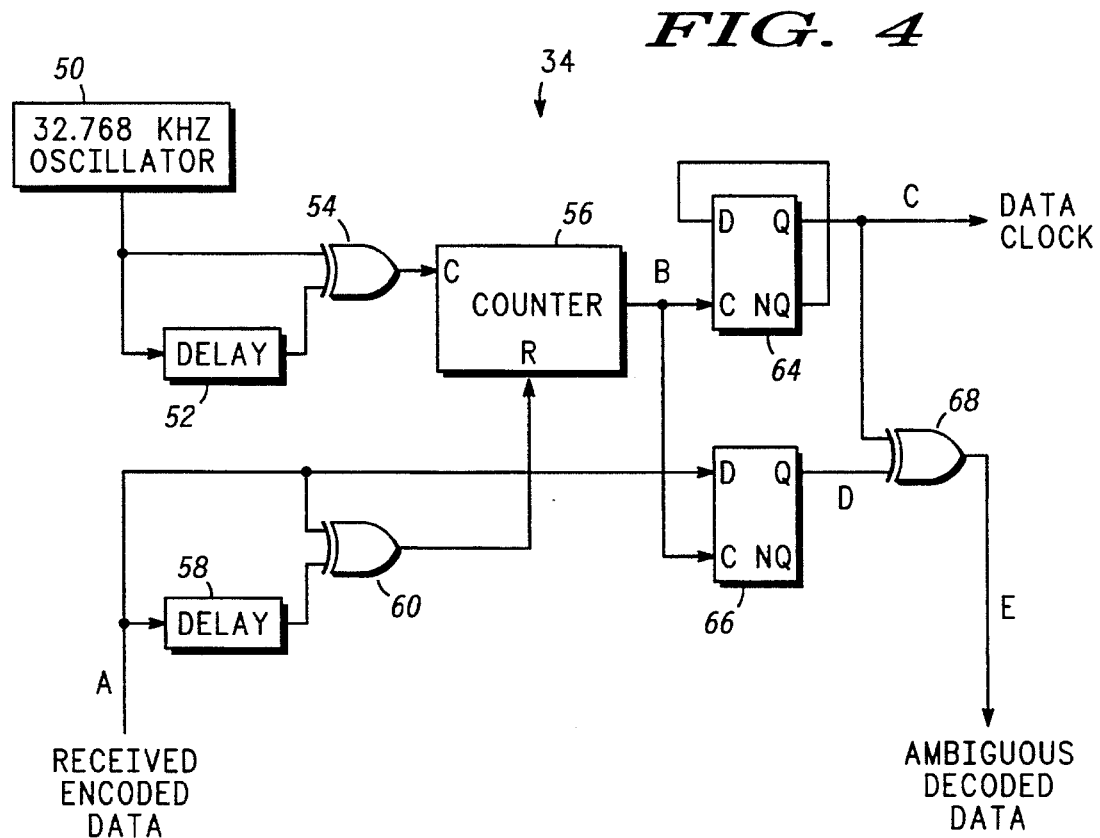
FIG. 4 shows a block diagram of a decoder portion of a power manager block from the electronic tag shown in FIG. 1.
Figure 6:
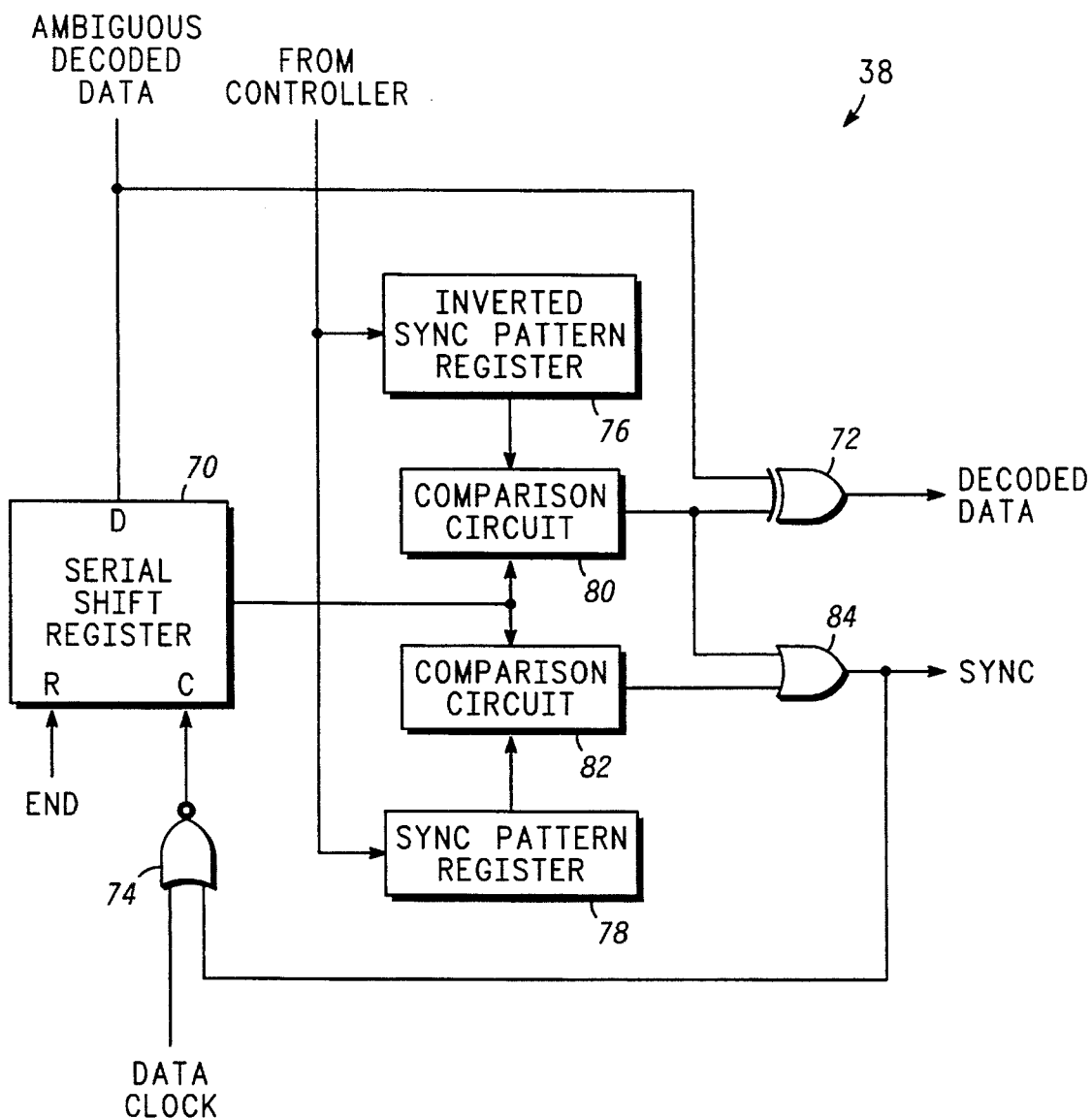
FIG. 6 shows a block diagram of a synchronizer portion of the power manager.
Figure 7:
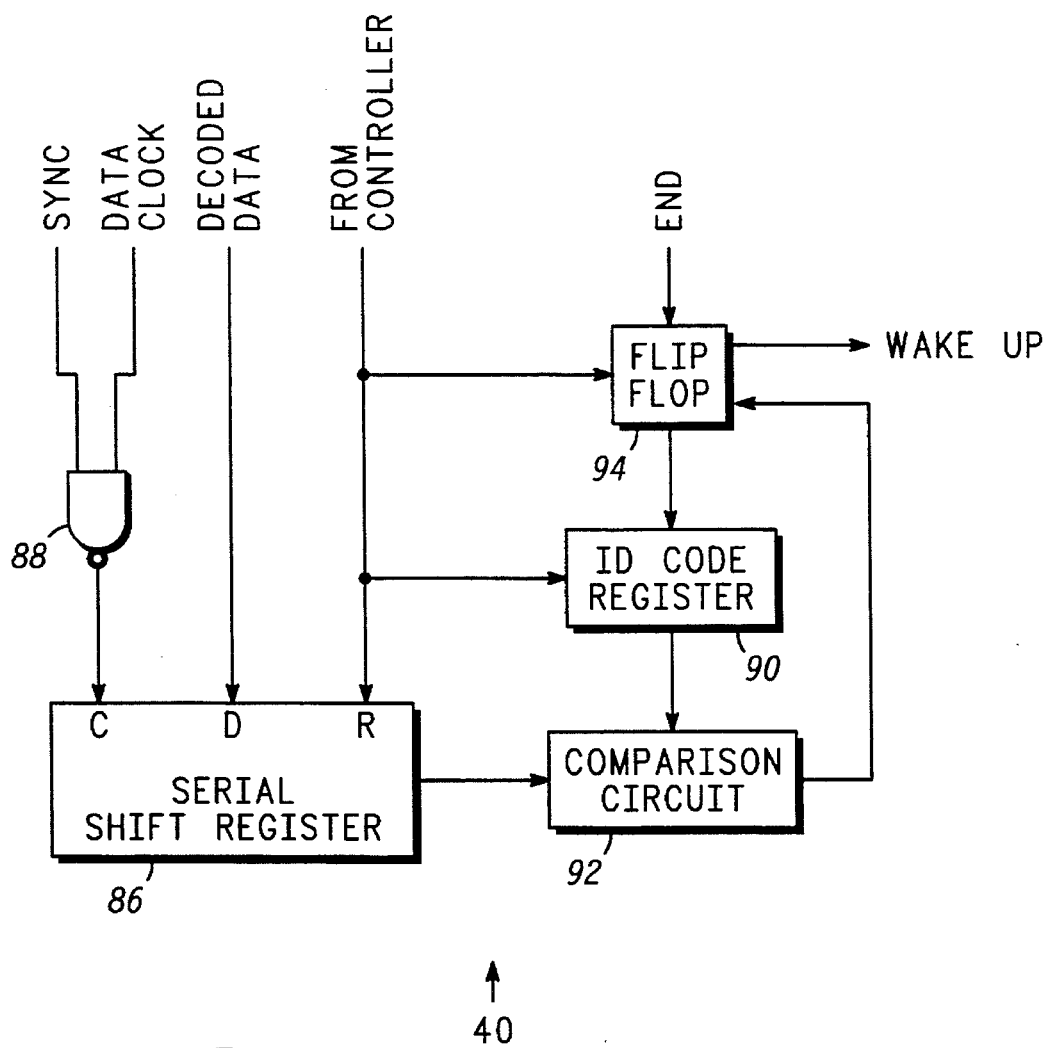
FIG. 7 shows a block diagram of an ID detector portion of the power manager.
Figure 8:
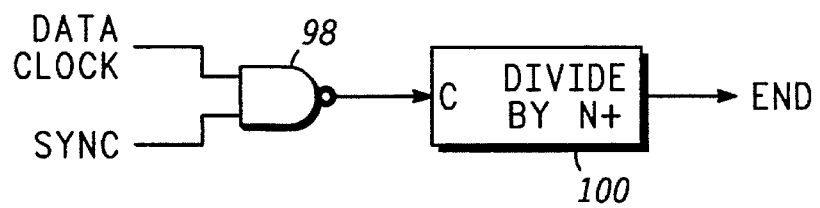
FIG. 8 shows a block diagram of an end detector portion of the power manager.

FIG. 4 is a block diagram of decoder 34 of power manager 28 (FIG. 1), FIG. 6 is a block diagram of synchronizer 38, FIG. 7 is a block diagram of ID detector 40, and FIG. 8 is a block diagram of end detector 36. The configurations of decoder 34, synchronizer 38, ID detector 40, and end detector 36 allow power manager 28 to monitor wake-up sections 20 of messages 18 (FIG. 2) while consuming very little power. Power manager 28 consumes less power than any other component within controller 30.

Decoder 34 (FIG. 4) includes free-running, low current, real time clock oscillator circuit 50, preferably consuming less than one micro Ampere and generating a clock signal oscillating at around 32.768 kHz. While other embodiments of the present invention may certainly accommodate oscillators operating at other frequencies, this specific frequency is beneficial because it is relatively slow insofar as electronic circuits are concerned. Oscillator 50 controls the rate at which power manager 28 experiences voltage changes taking place when the various digital signals within power manager 28 (FIG. 1) change states. Various semiconductor technologies, e.g., CMOS (preferred in the present invention due to its low power consumption), consume less power in a given period of time when fewer voltage changes take place in the given period of time. Thus, use of a slow oscillator 50 greatly contributes to the low power consumption of power manager 28. In addition, the preferred frequency for oscillator 50 is useful in the watch industry. Consequently, inexpensive, very low power, and reliable designs for oscillator 50 are well known.

Oscillator 50 couples to an edge discriminator circuit including delay element 52 and Exclusive OR gate 54. The duration parameter of delay element 52 produces a clock pulse for counter 56. An output of gate 54 produces a pulse every time the oscillation signal from oscillator 50 changes state, i.e., a clock signal having double the frequency of the oscillation signal from oscillator 50.

The output from gate 54 couples to a clock input (C) of counter 56, which is configured to count from a reset state for a number of counts chosen in accordance with the data rate of wake-up section 20 (FIG. 2) of data message 18. The number of counts is chosen so that an output from counter 56 oscillates at approximately twice the data rate. Counter 56 preferably divides by two when this data rate is around 16 kHz or divides by four when this data rate is around 8 kHz.

The received encoded data signal from amplifier 16 (FIG. 1) is supplied to an edge discriminator that includes delay element 58 and Exclusive OR gate 60. Gate 60 generates a pulse every time the received encoded data signal changes states. The output of gate 60 couples to a reset (R) input of counter 56. Counter 56 is reset every time the received encoded data signal changes states.

Figure 5:
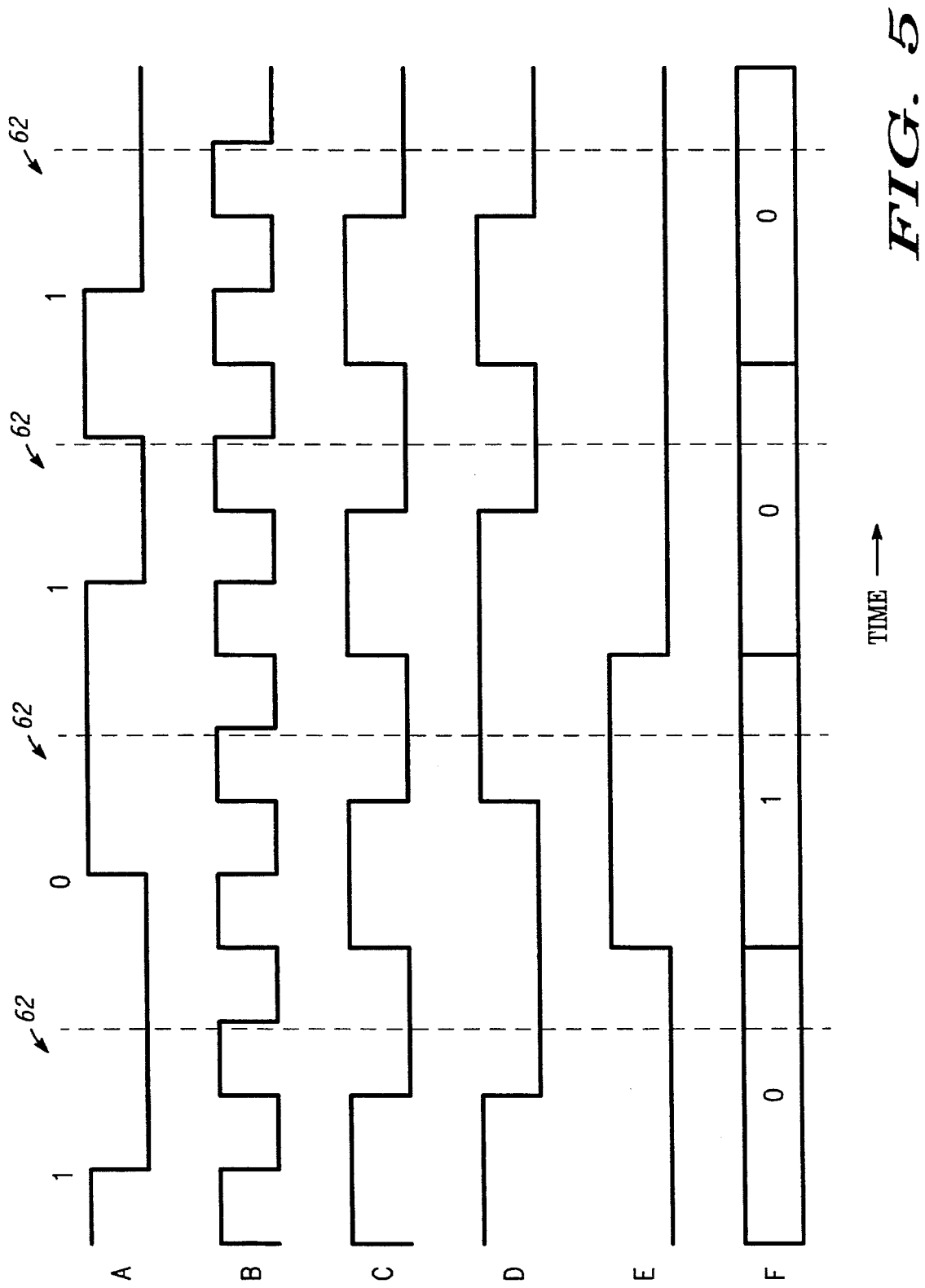
FIG. 5 shows a timing diagram which depicts exemplary signals associated with the decoder illustrated in FIG. 4.

FIG. 5 is a timing diagram depicting exemplary signals associated with the embodiment of decoder 34 illustrated in FIG. 4. With reference to FIGS. 4 and 5, waveform A depicts an exemplary Manchester coded, received data signal which conveys data bits, "1011" in this example (any data combination may be supplied). A data clock is combined with the data. The data are conveyed by transitions which occur in the middle of each bit 62 (timing depicted by vertical dotted lines, FIG. 5). The output from counter 56 (waveform B), represents a free-running signal that oscillates at roughly double the bit rate for signal A. The output of gate 60 re-synchronizes waveform B to the edge transitions of waveform A.

The output from counter 56 couples to clock inputs (C) of flip flops 64 and 66. Flip flop 64 is configured to toggle, with an inverting output (NQ) coupled to a data input (D). A non-inverting output (Q) of flip flop 64 provides a data clock (waveform C, FIG. 5). This output provides the data clock signal output of decoder 34. Flip flop 64 essentially divides the double frequency clock (waveform B) by two and squares up any lack of symmetry. The starting state of flip flop 64 is unknown relative to the reset state of counter 56. Waveform C may be inverted from the polarity shown in FIG. 5.

The received encoded data signal (waveform A), is applied to a data input (D) of flip flop 66. Non-inverting outputs of flip flops 66, 64 couple to inputs of Exclusive OR gate 68. The non-inverting output of flip flop 66 provides a Manchester coded data signal synchronized to the data clock produced by flip flop 64 (e.g., waveform D). Gate 68 separates the data clock from this synchronized Manchester coded data signal (e.g., waveform E). Waveform F illustrates bit timing associated with waveform E.

While gate 68 generates decoded data from the Manchester coded data signal, these data are provided in an ambiguous form. Due to the uncertainty associated with the state of flip flop 64 relative to the resetting of counter 56, these data are provided in either an inverted or non-inverted form. Data generated by gate 68 and by decoder 34 exhibits an unknown or ambiguous polarity.

Accordingly, a preferred embodiment of decoder 34 generates clock and data signals using only two flip flops, a small counter, three gates, two delay elements, and a low frequency oscillator circuit. These few components consume a very small amount of current. While decoder 34 could be configured to resolve the polarity ambiguity associated with the data output, this requires additional components and leads to additional power consumption while achieving little added benefit.

FIG. 6 is a block diagram of synchronizer 38. The ambiguous decoded data from decoder 34 (FIGS. 1, 4) are applied to a data input (D) of serial shift register 70 and to a first input of Exclusive OR gate 72. The data clock from encoder 34 is applied in the preferred embodiment to only a first input of an enabling circuit 74, illustrated in FIG. 6 as a NOR gate. An end signal which is generated by end detector 36 (FIG. 1) is applied to a reset input (R) of shift register 70. The end signal clears shift register 70 shortly after the end of wake-up section 20 (FIG. 2).

A data bus from controller 30 couples to inputs of inverted synchronization (sync) pattern register 76 and to sync pattern register 78. At some point when controller 30 is energized, controller 30 writes preamble 24 (FIG. 3), i.e. "1100" in the preferred embodiment, to register 78, and controller 30 writes the preamble inverted, i.e. "0011" in the preferred embodiment, to register 76. Registers 76, 78 retain these preamble data while controller 30 is de-energized.

An output from enabling circuit 74 couples to a clock input (C) of shift register 70. A parallel output from shift register 70 couples to respective first inputs of comparison circuits 80, 82. An output of inverted sync pattern register 76 couples to a second input of comparison circuit 80, and an output of sync pattern register 78 couples to a second input of comparison circuit 82. An output of comparison circuit 80 couples to a second input of Exclusive OR gate 72, and outputs of comparison circuits 80, 82 couple to respective inputs of OR gate 84. Exclusive OR gate 72 provides a decoded data signal representing the ambiguous data signal from decoder 34 (FIG. 4) with the ambiguity resolved. OR gate 84 provides a sync signal that activates when preamble 24 (FIG. 3) is detected. The output of OR gate 84 is fed back to a second input of enabling circuit 74.

So long as synchronizer 38 has not yet found preamble 24 (FIG. 3), the data clock clocks ambiguous decoded data into shift register 70. Comparison circuits 80, 82 continuously determine whether the pattern recorded in register 70 matches the inverted or the non-inverted preamble. As soon as either of the inverted or non-inverted preambles is discovered, gate 84 activates the sync signal, freezing the clock to register 70, which then retains the detected preamble pattern, and synchronizer 38 becomes disabled with its sync output signal active. The sync signal remains active until the end signal clears register 70 at the end of wake-up section 20.

Disabling synchronizer 38 causes the voltage changes experienced by synchronizer 38 to largely cease, causing drastically decreased power consumption. Enabling circuit 74 is configured to reduce the power consumption of synchronizer 38 after the sync signal activates. Synchronizer 38 consumes only a minuscule amount of power during identification code 26 of wake-up section 20 (FIG. 3). As discussed above, decoder 34 is desirably configured so that the data clock signal does not experience voltage changes during session section 22 (FIG. 2) and when no interrogation is being received. Thus, synchronizer 38 consumes a notable amount of power only during preamble 24 of wake-up section 20, and this notable amount is much less than the power consumed by any other component within controller 30 (FIG. 1).

Synchronizer 38 detects either the inverted or non-inverted preamble because the ambiguous decoded data from decoder 34 (FIG. 4) may present the preamble in either an inverted or non-inverted state. In addition, this adds robustness to the design of tag 10. Other devices in the communication channel through which interrogations are transmitted may or may not insert amplification stages etc. which invert their signals. Due to the ability of synchronizer 38 to handle ambiguous decoded data, tag 10 operates successfully regardless of the received signal polarity. Exclusive OR gate 72 removes ambiguity by inverting ambiguous decoded data when an inverted preamble is detected and not inverting the ambiguous decoded data when a non-inverted preamble is detected.

FIG. 7 is a block diagram of ID decoder 40. Unambiguous decoded data from synchronizer 38 (FIGS. 1, 6) are applied to a data input (D) of serial shift register 86. The data clock from decoder 34 is preferably applied to only a first input of enabling circuit 88, illustrated in FIG. 7 as a NAND gate. The sync signal from synchronizer 38 is applied to a second input of enabling circuit 88, and an output of enabling circuit 88 couples to a clock input (C) of shift register 86. The data bus from controller 30 (FIG. 1) couples to an input of an ID code register 90. A multi-bit, parallel output from register 90 couples to a first input of a comparison circuit 92, and a parallel output from shift register 86 couples to a second input of comparison circuit 92. An output of comparison circuit 92 couples to a data input of flip flop 94 whose clock input is adapted to receive the end signal generated by end detector 36. The end signal clocks flip flop 94 shortly after the end of identification code 26 (FIG. 3). The output from flip flop 94 provides a wake-up signal that serves as the output from both ID detector 40 and power manager 28.

A reset signal from controller 30 (FIG. 1) couples to a reset input of register 86 and to a reset input of flip flop 94. When controller 30 finishes its interrogation session and tag 10 no longer needs to be in its operational state, controller 30 may activate this reset signal to clear register 86 and flip flop 94, thereby de-energize controller 30 and returning tag 10 to a standby state.

At some point when controller 30 is energized, controller 30 writes identification code 26 (FIG. 3) to register 90. The identification code may be unique to tag 10 or it may classify tag 10 into a class with other tags 10 that have the same identification code. Nothing prevents the identification code from changing over time, and such changes can be accommodated by performing interrogations on tag 10 that instruct controller 30 to write specified data to register 90. Register 90 retains its identification code while controller 30 is de-energized.

Until the sync signal from synchronizer 38 (FIG. 6) activates, enabling circuit 88 holds ID decoder 40 in a disabled, frozen state, causing ID decoder 40 to consume only a minuscule amount of power. Enabling circuit 88 is configured to reduce the power consumption of ID decoder 40 before activation of the sync signal compared to its power consumption after activation of the sync signal.

After the sync signal activates, the data clock from decoder 34 clocks the decoded data from synchronizer 38 into shift register 86. If, at the end of identification code 26 (FIG. 3), data held in register 86 matches the identification code recorded in register 90, the wake-up signal is activated, and tag 10 enters its operational state. If the data held in register 86 do not match, the wake-up signal remains inactive and tag 10 remains in its standby state.

In an alternate embodiment, ID detector 40 may include duplicate ID registers 90 and comparison circuits 92 whose outputs are combined in an ORing circuit (not shown) and routed to flip flop 94. In this embodiment, a specific identification code may be stored in one register while a class or category code is stored in the other register. If identification code 26 (FIG. 3) of wake-up section 20 conveys either the specific identification code or the class code, tag 10 enters operational state so that it can process and respond to data conveyed during session section 22 (FIG. 2).

FIG. 8 is a block diagram of end detector 36. The data clock from decoder 34 (FIG. 4) is preferably applied to only a first input of enabling circuit 98, illustrated as a NAND gate. The sync signal from synchronizer 38 (FIG. 6) is applied to a second input of enabling circuit 98, and an output of enabling circuit 98 couples to a clock input (C) of dividing circuit 100. An output of dividing circuit 100 provides the above-discussed end signal that serves as the output from end detector 36.

Until the sync signal from synchronizer 38 (FIG. 6) activates, enabling circuit 98 holds end detector 36 in a disabled, frozen state, causing end detector 36 to consume only a minuscule amount of power. Thus, enabling circuit 98 is configured to reduce the power consumption of ID decoder 40 before activation of the sync signal compared to its power consumption after activation of the sync signal.

When the sync signal activates, dividing circuit 100 counts from an initialized state for a duration slightly greater than N bits, where N is the length in bits of identification code 26 (FIG. 3). Dividing circuit 100 may desirably count for around ½ bit or one bit beyond the end of identification code 26, then activate the end signal. As discussed above, the activation of the end signal serves to clock flip flop 94 (FIG. 7) which may or may not activate the wake-up signal. The end signal additionally resets shift register 70 (FIG. 6), which causes the sync signal to deactivate.

In summary, the present invention provides an improved low power, addressable data communication device. An electronic tag configured in accordance with the principles of the present invention exhibits improved battery life because the tag remains in a low current, standby state while in the presence of an interrogation signal except when the tag is specifically addressed by the interrogation signal. The tag includes two separate decoding paths for obtaining data from an interrogation signal. The separate decoding paths permit a low power decoding path to control energization of a high power decoding path. The low power decoding path is implemented by a power manager that decodes only a portion of an interrogation signal while consuming a very small amount of power. The encoding or modulation applied to the remaining portion of the interrogation signal may be configured so that it cannot be decoded by the power manager, but the higher power decoding path can decode this remaining portion.

The present invention has been described above with reference to preferred embodiments. However, those skilled in the art will recognize that changes and modifications may be made in these preferred embodiments without departing from the scope of the present invention. For example, nothing prevents the controller of the electronic tag from additionally becoming energized in occasional situations other than when the power manager detects the wake-up identification code. In addition, various comparisons indicated herein as being performed in parallel may, in alternate embodiments, be performed serially. Moreover, those skilled in the art will appreciate that the various polarities, gates, and specific components discussed above may all be altered in different embodiments of the present invention. These and other changes and modifications which are obvious to those skilled in the art are intended to be included within the scope of the present invention.

What is claimed is:

1. A low power, addressable data communication device comprising:

means for obtaining a data message having a wake-up section and a session section, said obtaining means including a receiver for continuously monitoring for said data message;

a power manager having an input coupled to said obtaining means and having an output, said power manager for detecting a predetermined identification code from said wake-up section of said data message by continuously monitoring for said identification code and coupling said output to a battery when said predetermined identification code is detected; and a controller having a power input coupled to said power manager output and having a data input coupled to said obtaining means, said controller being configured to process said session section of said data message after said power manager detects said predetermined identification code, wherein said wake-up section of said data message combines wake-up data with a clock signal, and said power manager comprises:

a decoder for separating said clock signal from said wake-up data;

a synchronization circuit coupled to said decoder, said synchronization circuit being configured to detect a predetermined preamble code in said wake-up data; and an ID detection circuit coupled to said synchronization circuit, said ID detection circuit being configured to determine when a predetermined identification code follows said predetermined preamble code in said wake-up data.

2. A device as claimed in claim 1 wherein:

said data message obtained by said obtaining means conveys encoded data;

said power manager comprises a first decoder coupled to said obtaining means; and said controller comprises a second decoder coupled to said obtaining means.

3. A device as claimed in claim 2 wherein said first decoder is configured to consume less power than said second decoder.

4. A device as claimed in claim 2 wherein:

said wake-up section of said data message conveys data at a first rate and said session section of said data message conveys data at a second rate, said first rate being slower than said second rate; and said first decoder is configured to decode at said first rate and said second decoder is configured to decode data at said second rate.

5. A device as claimed in claim 4 wherein said first decoder is configured to decode at a rate of no greater than approximately 17 kHz.

6. A device as claimed in claim 2 wherein:

said wake-up section of said data message combines a data signal and a clock signal; and said first decoder is configured to separate said clock signal from said data signal.

7. A device as claimed in claim 1 wherein:

said device is an electronic tag;

said data message is conveyed to said device through a radio frequency (RF) signal; and said controller comprises a transmitter configured to broadcast an RF signal.

8. A device as claimed in claim 1 wherein said synchronization circuit comprises:

a shift register having a data input adapted to receive said wake-up data, having a clock input, and having a parallel data output;

a comparison circuit coupled to said parallel data output of said shift register, said comparison circuit being configured to activate a synchronization signal when said predetermined preamble code is detected at said parallel data output; and an enabling circuit having a first input adapted to receive said clock signal, a second input adapted to receive said synchronization signal, and an output coupled to said shift register clock input, said enabling circuit being configured to reduce power consumption of said synchronization circuit after said synchronization signal activates compared to its power consumption prior to activation of said synchronization signal.

9. A device as claimed in claim 1 wherein said synchronization circuit activates a synchronization signal when said predetermined preamble code is detected, and said ID detection circuit comprises:

a shift register having a data input adapted to receive said wake-up data and having a clock input; and an enabling circuit having a first input adapted to receive said clock signal, a second input adapted to receive said synchronization signal, and an output coupled to said shift register clock input, said enabling circuit being configured to reduce power consumption of said ID detection circuit prior to activation of said synchronization signal compared to its power consumption after activation of said synchronization signal.

10. A device as claimed in claim 1 wherein:

said decoder is configured to generate an ambiguous data signal which conveys either non-inverted data or inverted data; and said synchronization circuit is configured to detect either said predetermined preamble code or said predetermined preamble code inverted.

11. A method of operating an addressable data communication device, said method comprising steps of:

energizing a receiver and a decoder continuously from an internal power source;

receiving a data message having a wake-up section which conveys data at a first rate followed by a session section which conveys data at a second rate, said second rate being greater than said first rate;

decoding said wake-up section of said data message by said decoder to detect a predetermined identification code; and energizing from an internal power source, when said decoding step detects said predetermined identification code, a controller configured to detect and process data conveyed during said session section, wherein:

said wake-up section of said data message combines a data signal and a clock signal; and said decoding step comprises a step of separating said clock signal from said data signal.

12. A method as claimed in claim 11 wherein a power manager includes said decoder, said power manager is configured to perform said decoding step, and said power manager is configured to consume less power than said controller.

13. A method as claimed in claim 11 wherein said decoding step is configured so that said first rate is less than approximately 17 kHz.

14. A method as claimed in claim 11 wherein:

said device is an electronic tag;

said data message is conveyed to said device through a radio frequency (RF) signal; and said method additionally comprises a step of transmitting an RF signal in response to said energizing step.

15. A method as claimed in claim 11 wherein:

said decoding step is performed by a power manager which includes a synchronization circuit that detects a predetermined preamble code in said wake-up section of said data message and an ID detection circuit that determines when a predetermined identification code follows said predetermined preamble code in said wake-up section of said data message; and said decoding step comprises a step of disabling said ID detection circuit until said predetermined preamble code is detected and disabling said synchronization circuit after said predetermined preamble code is detected.

16. A low power, addressable, electronic tag which selectively responds to a radio frequency interrogation signal comprising:

means, adapted to receive said interrogation signal, for stripping a carrier from a data message, said data message having a wake-up section, which conveys data at a first rate, followed by a session section, which conveys data at a second rate, said second rate being greater than said first rate, wherein said means adapted to receive said interrogation signal operates continuously;

a power manager having an input coupled to said stripping means and having an output, said power manager configured to continuously monitor for and detect a predetermined identification code from said wake-up section of said data message, and, when said predetermined identification code is detected, coupling an internal power source to said output; and a controller having a power input coupled to said power manager output and having a data input coupled to said stripping means, said controller being configured to process said session section of said data message and to at least occasionally transmit an RF response signal if said power manager detects said predetermine identification code, wherein:

said wake-up section of said data message combines a data signal and a clock signal; and said power manager comprises a decoder which is configured to separate said clock signal from said data signal.

17. A tag as claimed in claim 16 wherein said power manager additionally comprises:

a synchronization circuit coupled to said decoder, said synchronization circuit being configured to detect a predetermined preamble code in said wake-up data; and an ID detection circuit coupled to said synchronization circuit, said ID detection circuit being configured to determine when a predetermined identification code follows said predetermined preamble code in said wake-up data.

18. A tag as claimed in claim 17 wherein said synchronization circuit comprises:

a shift register having a data input adapted to receive said wake-up data, having a clock input, and having a parallel data output;

a comparison circuit coupled to said parallel data output of said shift register, said comparison circuit being configured to activate a synchronization signal when said predetermined preamble code is detected at said parallel data output; and an enabling circuit having a first input adapted to receive said clock signal, a second input adapted to receive said synchronization signal, and an output coupled to said shift register clock input, said enabling circuit being configured to reduce power consumption of said synchronization circuit after said synchronization signal activates compared to its power consumption prior to activation of said synchronization signal.

19. A tag as claimed in claim 17 wherein said synchronization circuit activates a synchronization signal when said predetermined preamble code is detected, and said ID detection circuit comprises:

a shift register having a data input adapted to receive said wake-up data and having a clock input; and an enabling circuit having a first input adapted to receive said clock signal, a second input adapted to receive said synchronization signal, and an output coupled to said shift register clock input, said enabling circuit being configured to reduce power consumption of said ID detection circuit prior to activation of said synchronization signal compared to its power consumption after activation of said synchronization signal.

* * * * *